United States Patent [19]
Cochcroft, Jr. et al.

[11] Patent Number: 5,317,738
[45] Date of Patent: May 31, 1994

[54] PROCESS AFFINITY SCHEDULING METHOD AND APPARATUS

[75] Inventors: Arthur F. Cochcroft, Jr., West Columbia; Jimmy D. Pike, Greenville, both of S.C.

[73] Assignee: NCR Corporation, Dayton, Ohio

[21] Appl. No.: 836,487

[22] Filed: Feb. 18, 1992

[51] Int. Cl.⁵ .............................................. G06F 12/08
[52] U.S. Cl. .................................... 395/650; 395/425; 364/DIG. 1; 364/243.41; 364/243.4; 364/243.44; 364/243; 364/228.3
[58] Field of Search ............... 395/650, 425, 200, 400, 395/800

[56] References Cited

U.S. PATENT DOCUMENTS

| | | | |
|---|---|---|---|
| 4,316,245 | 1/1982 | Luu et al. | 364/200 |
| 4,775,955 | 10/1988 | Liu | 364/900 |
| 4,809,157 | 2/1989 | Eilert et al. | 364/200 |
| 5,006,982 | 4/1991 | Ebersole et al. | 364/200 |
| 5,109,512 | 4/1992 | Bahr et al. | 395/650 |
| 5,148,533 | 9/1992 | Joyce et al. | 395/425 |
| 5,155,831 | 10/1992 | Emma et al. | 395/425 |
| 5,185,861 | 2/1993 | Valencia | 395/200 |
| 5,193,168 | 3/1993 | Corrigan et al. | 395/425 |
| 5,193,172 | 3/1993 | Arai et al. | 395/425 |
| 5,197,139 | 3/1993 | Emma et al. | 395/400 |

Primary Examiner—Kevin A. Kriess
Attorney, Agent, or Firm—Paul W. Martin; Jack R. Penrod

[57] ABSTRACT

Process migration is controlled in multiple processor system by a circuit providing a rapid lookup to see if an available process has any affinity for the top N entries on the system run queue. If the currently available processor has an affinity for, i.e. has one or more lines of operands and/or instructions stored in its local cache related to the process, then the processor selects the process it has affinity for from the top N processes on the run queue. In this manner, unnecessary replacements of cache lines with data from main memory is reduced.

7 Claims, 6 Drawing Sheets

CRG0 -- OFFSET 0 IN HAPAS I/O SPACE

| D31 | D30 | D29 | D29 --- D9 | D8 | D7 | D6 | D5 | D4 | D3 | D2 | D1 | D0 |
|---|---|---|---|---|---|---|---|---|---|---|---|---|
| ENABLE | OP1 | OP2 | UNUSED | K/U | ←------------- PID (7:0) -------------→ |

FIG. 6

PAC ENTRY READ PORTS -- OFFSETS 0x4 – 0x20 OFFSET 0x4 READS PAC ENTRY 0, 0x8 READS PAC ENTRY 1, ETC.

| ←--D31 – D25--→ | D24 | ←--D23 – D16--→ | ←------- D15 – D0 -------→ |
|---|---|---|---|
| UNUSED | VALID | RPID_n (7:0) | COUNT_n (15:0) |

FIG. 7

CRG1 ACCESS -- WRITE TO OFFSET 0x24   NOTE: WRITE D24 (PROBE FLAG) = 1

| ←--D31 – D25--→ | D24 | ←--D23 – D16--→ | ←------- D15 – D0 -------→ |
|---|---|---|---|
| UNUSED | PROBE | PID_n (7:0) | WRITE ALL ZEROS |

FIG. 8

PRR READ PORT -- READ OFFSET 0x28   NOTE: IF NFF = 1, COUNTER VALUE = 0x0

| ←--D31 – D25--→ | D25 | D24 | ←--D23 – D16--→ | ←------- D15 – D0 -------→ |
|---|---|---|---|---|
| UNUSED | FF | NFF | PID_n (7:0) | COUNT_n (15:0) |

PROCESS AFFINITY SCHEDULING METHOD AND APPARATUS

BACKGROUND OF THE INVENTION

The present invention relates to computer systems having multiple processors, and more particularly to a method and apparatus for scheduling each process with a processor that can efficiently execute the process.

In a multiple processor computer system that shares information stored in a common system memory, a given process may become active and execute at various times on various processors. This process migration from one processor to another may occur for numerous reasons. The process may be suspended from running on one of the multiple processors while the process is waiting for an input/output operation to complete. When the input/output operation is completed, the waiting process is marked as ready to run and placed on the run queue. From the run queue, the process may be selected by the next available processor of the multiple processors, which is not necessarily the processor that the process was previously executed by before the suspension. The process may also be suspended from running on a processor because the time slice allocated thereto has expired. Once a process' time slice has expired, the process is typically assigned a lower priority and placed on the run queue, where it may be selected by another processor for execution, i.e. it may migrate.

Migration of a process among multiple processors is a fairly recent problem, because system architectures having multiple processor with each processor having a large capacity cache memory associated therewith are fairly new. This system architecture is, however, a common architecture for modern computer systems. Cache memories are included in order reduce system bus data bandwidth and memory data bandwidth requirements. Cache memories reduce data bandwidth requirements by reducing the number of accesses made to the common system memory to fetch instructions or to read or write operands. Cache memories also reduce the cycle time of an average operation because a data transfer between a processor and its local cache memory is faster than a transfer between the same processor and the more distant common system memory, as is well known.

Process migration, however, typically results in a cache miss, instead of a cache match, and a cache miss results in a lengthy load operation from system memory. Each time a process migrates to a new processor, the migration starts with a cache miss that is followed by a subsequent loading of all or part of the process from system memory. Thus, frequent cache misses followed by lengthy loads from system memory have a negative effect on system bus and memory data bandwidths. This is exactly the opposite result desired by implementing a system architecture having multiple processors with large local caches.

Besides the processor time lost with the cache loading, each time a process migrates, the instructions and operands of that process are duplicated and stored in another cache memory. Needlessly duplicated copies of the same process waste limited cache memory space. Further, migration causes unnecessary cache line replacements of soon-to-be-used processes.

To prevent uncontrolled process migration, some computer system providers have included a type of process affinity scheduling as part of their systems software. Unfortunately, solutions that are entirely software based either takes up a considerable amount of processor time and system data bandwidth, or they are considerably less comprehensive and thereby do not achieve substantial gains in performance.

It is an object of the present invention to provide a hardware based affinity scheduling apparatus for a computer system having multiple processors in order to reduce process migration.

It is another object of the present invention to provide a method for operating a hardware based affinity scheduling apparatus for a computer system having multiple processors in order to reduce process migration.

SUMMARY OF THE INVENTION

Briefly stated, in accordance with one aspect of the invention the foregoing objects are achieved by providing an apparatus for use with a computer system having a plurality of processors each having a local external cache memory. The apparatus includes an affinity cache device for storing in a plurality of cache data lines identification codes that identify the most recently executed user processes. Each of the cache data lines contains data which indicates the number of data lines occupied in the local external cache by a respective user process. Additionally the apparatus has a device for comparing an identification code of a ready-to-run process listed in a run queue of the computer system to each of the identification codes in the affinity cache device to determine if a user process has an affinity for an available processor.

In another aspect of the invention, the aforementioned objects are achieved by providing in a computer system having multiple processors with each processor having a cache memory, a method of selecting a process from a run queue for execution by a processor. This method includes the steps of: assigning a unique affinity identification code to each active process; storing the affinity identification codes of N most recent processes executed by each respective processor; associating for each of the N most recent processes of each processor a count of a number of cache lines occupied in each cache memory with the affinity identification code assigned thereto and storing each of the counts with its associated affinity identification code; each processor selecting from the run queue a next process with an affinity identification code that corresponds to one of the N most recently executed processes if such process is on the run queue, otherwise selecting the highest priority process on the run queue.

In another aspect of the invention, the foregoing objects are achieved by providing in a computer system having multiple processors with each processor having a cache memory, a method of selecting a process from a run queue for execution, said method comprising the steps of assigning a unique affinity identification code to each active process; storing the affinity identification codes of N most recent processes executed for each respective processor; associating for each of the N most recent processes of each processor a count of a number of cache lines occupied in each cache with the affinity identification code assigned thereto and storing each of said counts with its associated affinity identification code; and each processor selecting from the run queue a next process with an affinity identification code that corresponds to the process of the N most recently executed processes that has the greatest number of lines of data stored in the local cache memory.

BRIEF DESCRIPTION OF THE DRAWINGS

While the specification concludes with the appended claims particularly pointing out and distinctly claiming the subject matter which is regarded as the invention, it is believed that the invention will be better understood from the following description taken in conjunction with the accompanying drawings in which:

DETAILED DESCRIPTION

Figure 1:
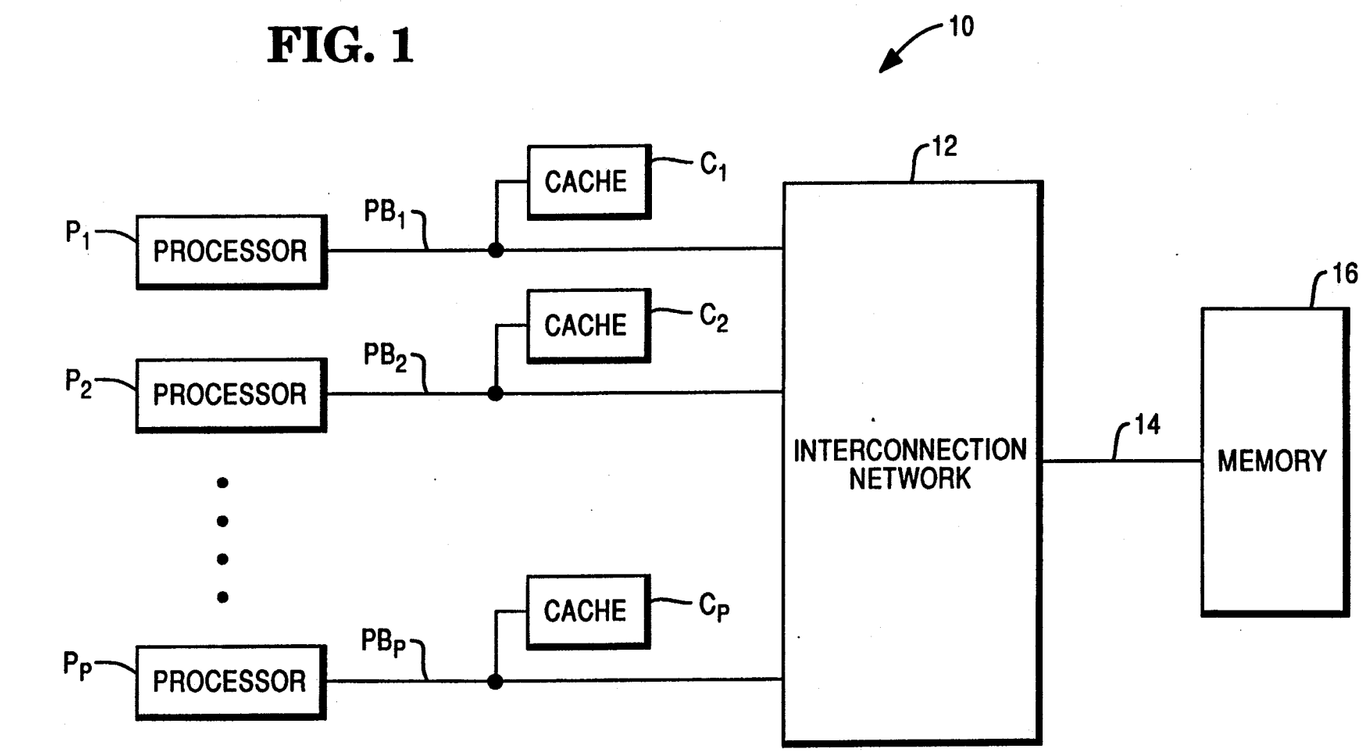
FIG. 1 is a simplified block diagram of a computer system having P processors.

Referring now to FIG. 1, a computer system 10 having multiple processors $P_1-P_P$ is shown. Each of the processors $P_1-P_P$ has a respective cache memory $C_1-C_P$ attached thereto. Each of the processors $P_1-P_P$ is connect via a respective processor bus $PB_1-PB_P$ to a system interconnect network 12, for example a parallel system bus. The interconnect network 12 is also connected to a common system memory 16 via a memory bus 14. The common memory 16 may be accessed by any of the processors $P_1-P_P$ via the interconnect network 12. The system 10, unless preventive measures are taken, will be prone to random process migration.

Figure 2:
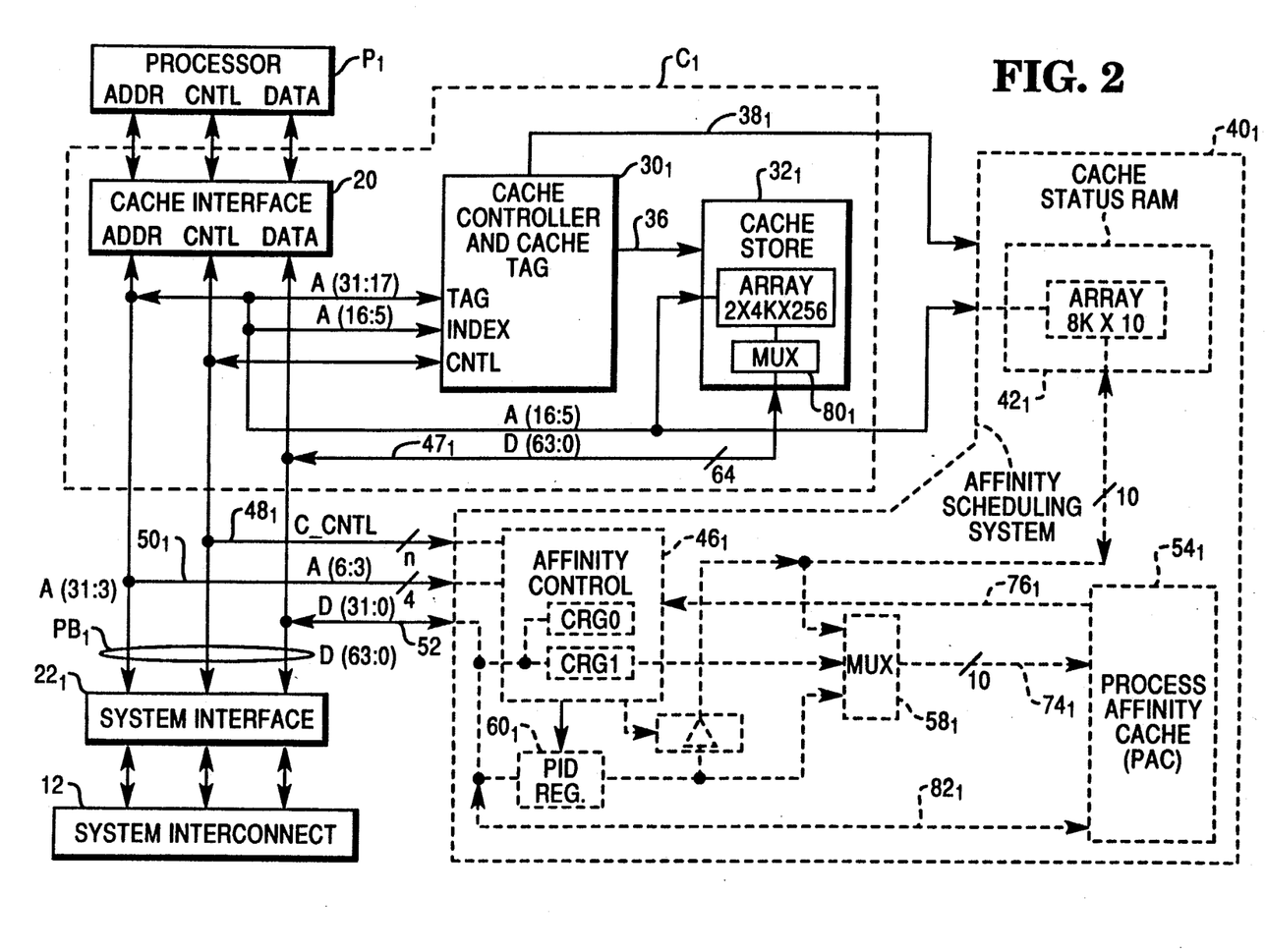
FIG. 2 is a block diagram of one of the P processors with its respective cache memory and its respective affinity scheduling circuits.

Referring now to FIG. 2, a detailed description of processor $P_1$ of the P multiple processors of the computer system is given. Since all of the processors are substantially the same, those skilled in the art will understand the structure and operation of the remaining processors and their cache arrangements from the description of $P_1$ and its cache arrangement. Thus for simplicity, only P1 and its cache arrangement will be described.

Processor $P_1$ is connected to a cache interface 20, which allows the cache memory system $C_1$ to interact with the processor $P_1$ and the common system memory (shown in FIG. 1) using any one of a number of standard cache protocols. The cache interface 20 connects the processor $P_1$ to the cache memory system $C_1$ and to the processor bus $PB_1$. The processor bus $PB_1$ has a 32 bit parallel address bus, a 64 bit parallel data bus, and an n bit parallel control bus. Processor bus $PB_1$ further connects to the system interconnect 12 via a system interconnect interface $22_1$.

The cache memory system includes a cache controller and cache tag memory (cache controller) $30_1$ and a cache memory store $32_1$. The cache memory store $32_1$ has a capacity of 8K lines, with each line having 256 bits. The cache controller $30_1$, may be a well known type such as a type 82485 by Intel Corporation, which operates with one or more standard static RAM arrays as the cache memory store $32_1$. Those skilled in the art will recognize that other size cache stores and lines sizes are possible modifications and such modifications are deemed to be within the scope of the present invention.

The affinity scheduling system $40_1$ is connected to the processor bus $PB_1$ and to the cache controller 301. The affinity scheduling system $40_1$ includes a cache status RAM $42_1$, which in the embodiment of FIG. 2 is an 8K by 10 bit RAM. The address input leads for the cache status RAM $42_1$ are the same leads, A16-A5, as the address input leads to the cache memory store $32_1$. By this arrangement, each entry in the cache status RAM $42_1$ is associated with a 256 bit line in the cache memory store $32_1$ and is a logical extension of each 256 bit line by 10 additional bits.

Figure 3:
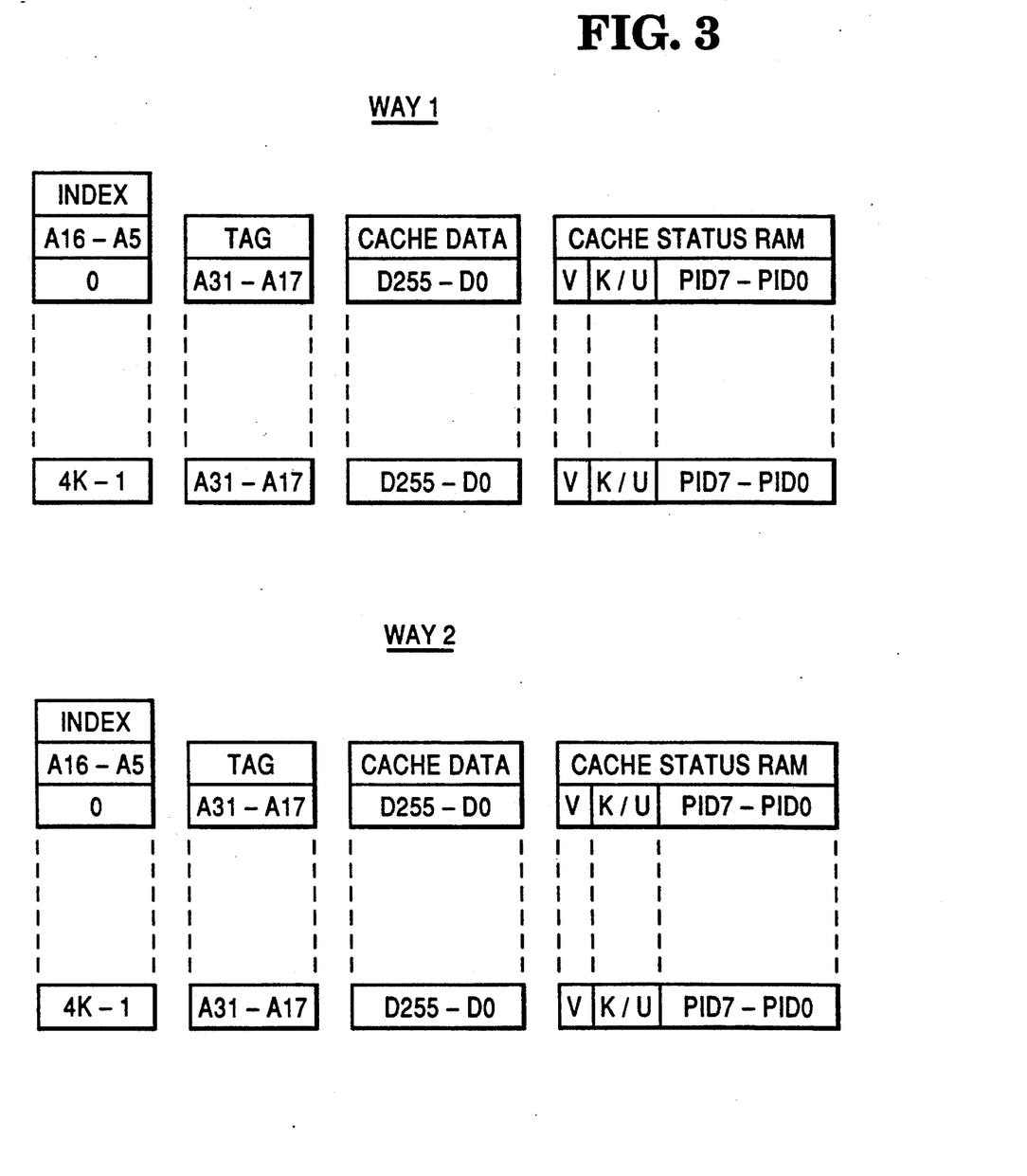
FIG. 3 is an illustration of the arrangement of data fields in the cache memory and the affinity scheduling circuits shown in FIG. 2.

Referring to FIGS. 2 and 3, the arrangement and use of cache status RAM $42_1$ will be explained. As mentioned above, cache memory store $32_1$ and cache status RAM $42_1$ are both connected to address lines A16-A5. This connection allows access to 4K addresses. The cache controller $30_1$ is connected to address lines A31-A17 of $PB_1$ in order to transfer cache tag addresses, to address lines A16-A5 thereof in order to transfer cache index addresses, and to n lines of the control bus of $PB_1$ in order to transfer control signals with the processor $P_1$. The cache controller $30_1$ uses information from address lines A31-A17 to select between the two 4k arrays of cache memory store $32_1$ and also to select a set of addresses from the 8k array of the cache status RAM $42_1$. Each of the addresses from cache status RAM $42_1$ is associated with a respective address of the cache memory store $32_1$. Line 36 connects the cache controller $30_1$ to the cache memory store $32_1$. An array selection signal is provided via line 36. Line 38 connects the cache controller $30_1$ to the cache status RAM $42_1$ to provide a set selection signal. Thus the cache controller $30_1$ not only is used to operate the cache memory store $32_1$ according to standard cache protocols, but also is used to coordinate the association of each of the 256 bit cache data lines in the cache memory store $32_1$ with each 10 bit line of the cache status RAM $42_1$.

The cache memory store $32_1$ has a 64 bit wide data input connected via data bus $47_1$ to lines D31-D0 of processor bus $PB_1$. Over data bus $47_1$, 64 bits of a 256 bit cache data line are transferred under control of the cache controller $30_1$ and address lines A31-A5 in a manner known in the art. The data bits stored in the 10 bit lines of cache status RAM $42_1$ are controlled by $P_1$ and the affinity control $46_1$, as explained below.

The affinity control $46_1$ is connected via a cache control bus $48_1$ to control lines of the control bus of processor bus $PB_1$. This cache control bus $48_1$ provides the affinity control $46_1$ with control signals from processor $P_1$ and cache controller $30_1$ in order to store and retrieve affinity information in association with each of the 256 bit cache lines in cache memory store $32_1$. Storage and retrieval of affinity information is accomplished under control of the operating system of processor $P_1$ in a manner similar to the operation of the cache system $C_1$. In addition to the control bus $48_1$, the affinity control $46_1$ is connected by bus $50_1$ address lines A6-A3 of the address bus of $PB_1$ and by data bus $52_1$ to lines D31-D0 of the data bus portion of $PB_1$.

The processor $P_1$ in conjunction with the other processors execute the operating system software and assigns a processor identification number (PID) to each process as it becomes active. The embodiment shown in FIG. 4 has 8 bits, so PIDs between 0 and 255 are assigned to the first 256 active processes as aliases of unique 32 bit process identification numbers that are pre-assigned to all of the processes that run on the computer system 10 (shown in FIG. 1). For an eight processor system, a total of 256 identification codes corresponds to 32 currently active processes per processor which is considered more than enough for system usage. If the number of active processes exceeds 256, a replacement process, similar to the least recently used cache replacement strategy can be implemented to re-assigned aliases. For larger systems with more than 256 active processes, the number of bits in the PID could be extended as required.

In one embodiment of the invention, each processor $P_1-P_P$ has an on-chip 8k byte directly mapped cache memory store. To make the affinity scheduling system operate best, data inclusion between the on-chip cache memory store and the off-chip cache memory store $32_1$ is provided by the protocol of the cache controller $30_1$ such that all information in the on-chip cache memory store is also in the cache memory store $32_1$. Further, in such an embodiment the operating system assigns the 32 bit process identification number of the process to the operating system kernel that is servicing the process. To account for this, a ninth bit termed a kernel/user bit is added to each PID so the affinity scheduling system may distinguish between the user process and the operating system kernel that is servicing the user process. The former is included in the affinity scheduling system and the latter is not.

The tenth bit shown in each 10 bit line of the cache status RAM $42_1$ is a valid/invalid bit. When a line in the cache status RAM $42_1$ is initially stored, it is marked valid, but if the PID is written to again in an operation with the local processor or another processor then the status of the cache line may be invalid and if so it is marked invalid by changing this bit.

Figure 4:
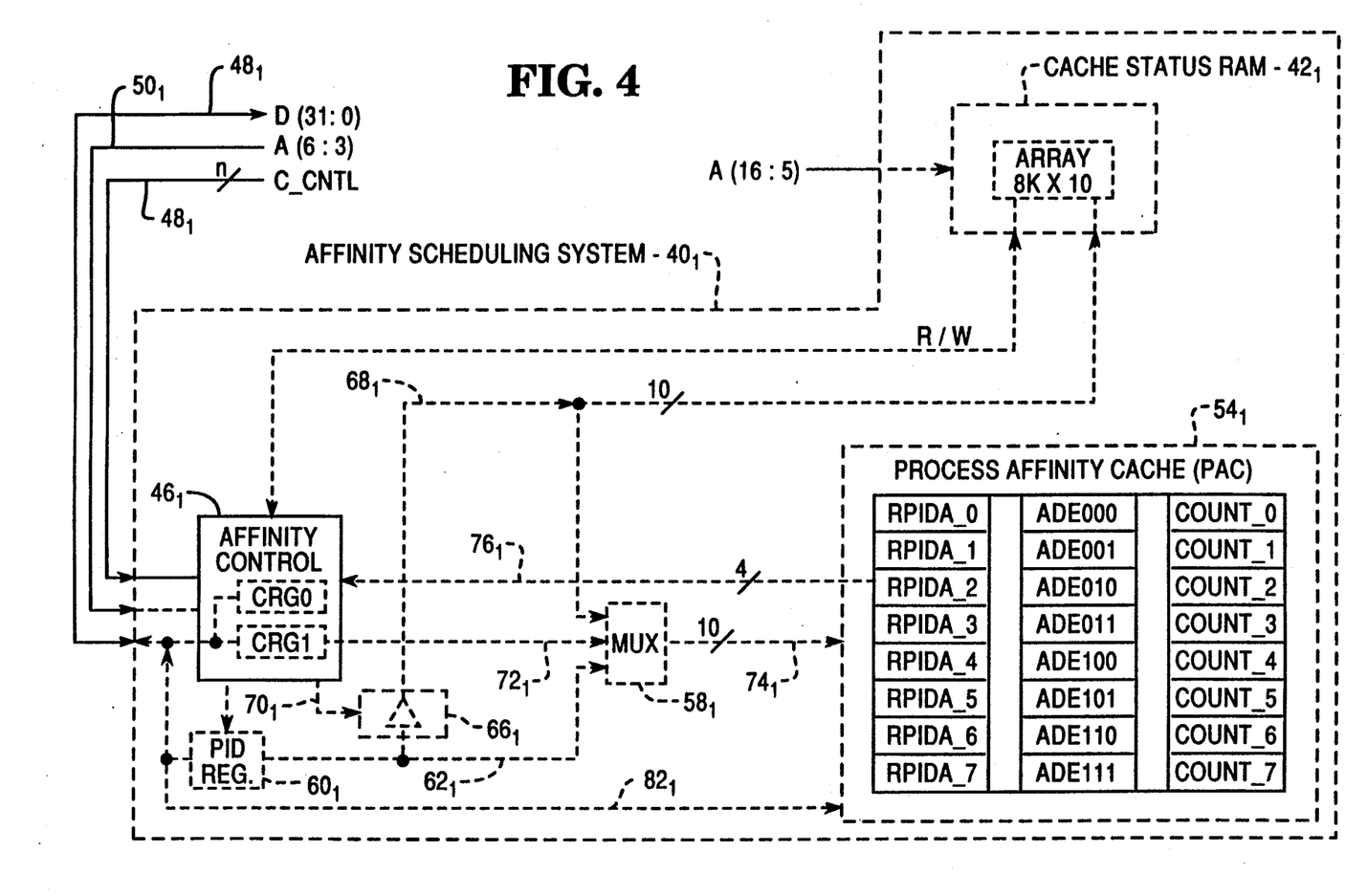
FIG. 4 is a block diagram of an affinity scheduling circuit in accordance with the invention.
Figure 5:
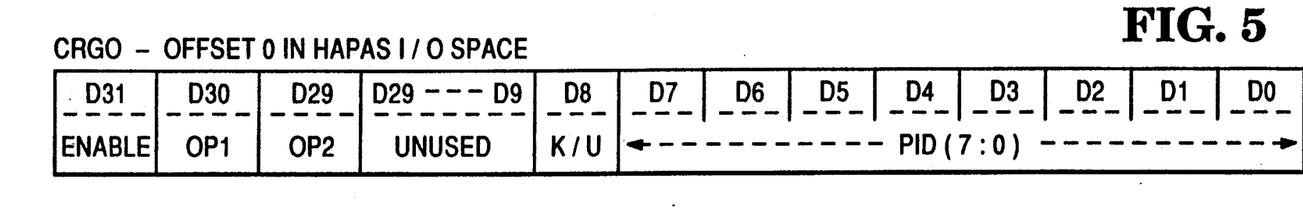
FIG. 5 is a block diagram of control register zero according to the invention.

Referring now to FIGS. 4 and 5, the affinity scheduling system will be described in greater detail. The data bus $52_1$ is connected to a PID register $60_1$ and the PAC $54_1$, as well as the affinity control $46_1$. A nine bit output from the PID register $60_1$ is connected by bus $62_1$ to MUX $58_1$ and by bus $64_1$ to a controlled bus driver $66_1$. The output of the controlled bus driver $66_1$ is connected to the cache status RAM $42_1$ and to another input of the MUX $58_1$ by bus $68_1$. The affinity control $46_1$ is connected to the bus driver $66_1$ via line $70_1$ and controls transmission of data signals over bus $68_1$ by a signal transmitted therethrough. The MUX $58_1$ has a third input connected to an eight bit output from the affinity control $46_1$ via bus $72_1$. An eight bit output of the MUX $58_1$ is connected via bus $74_1$ to PAC $54_1$.

The affinity scheduling system $40_1$ is assigned its own address space. The affinity control $46_1$ uses this address space as an Input/Output address space. A first control register (CRG0) is located at address offset zero in this Input/Output address space. In the preferred embodiment shown in FIG. 5, this register is 32 bits wide, although twenty of the bits are not used. Operation of the affinity scheduling system $40_1$ is enabled by setting bit 31 of CRG0 to a logic 1. Once enabled, control register CRG0 can be written to by processor $P_1$ in order to load a PID or a kernel/user bit into the affinity control $46_1$. With the PID bits or the kernel/user bit the processor $P_1$ also writes a two binary bit operation code that instructs the affinity control $46_1$ what action is to be taken between the CRG0 and a process affinity cache (PAC) $54_1$. The four operations that involve the control register zero CRG0 and the PAC $54_1$ are shown in Table 1.

TABLE 1

| D30 | D29 | OPERATION |
|-----|-----|-----------|
| 0 | 0 | Toggle kernel/user bit in the PAC, no PID change. |
| 0 | 1 | Loading new PID, allocate to PAC if needed. |
| 1 | 0 | Loading new PID but re-using PID from a different process; allocate to PAC if needed and clear count if in PAC. |
| 1 | 1 | Invalidate all PAC entries and clear every count in the PAC. |

The PAC $54_1$ is a fully associative cache. In the preferred embodiment, the PAC $54_1$ is an 8 by 32 bit cache. The format of each line in the PAC $54_1$ is shown in FIG. 4. The eight RPID fields are locations for eight most recently used USER PIDs that are used by processor $P_1$. Each of the eight RPID fields has associated with it a four bit PAC address-and-enable signal (ADE 3:0), and a sixteen bit count field. The count field represents the number of cache lines in the cache status RAM $42_1$ that are occupied by the process corresponding to each RPID in PAC $54_1$.

Either of the loading operations shown in Table 1 (01) or (10) will allocate one or more lines for a USER PID, i.e. a PID with its kernel/user bit=0, a location in the PAC $54_1$ if that PID is not already stored in the PAC. For the loading and re-using of a PID from a different process operation (10), if the PID is found in the PAC $54_1$, the cache line count field for that PID will be cleared.

During either type of loading operation (01 or 10), the MUX $58_1$ switches the PID of the current process from the PID register $60_1$ to the PAC $54_1$ via bus $74_1$. Since the PAC $54_1$ is a fully associative cache memory, all of the RPIDs are compared to the current process PID in parallel, except that any RPID that is marked as invalid by valid/invalid bit is omitted from this comparison. If the current process PID matches one of the RPIDs, a match signal, which includes an enable and a three bit address, is sent on a four conductor bus $76_1$ is sent from the PAC $54_1$ to the affinity control $46_1$. The three bit address on bus $76_1$ is the logical line address of the matching RPID. The processor $P_1$ then completes the loading process with the affinity data into PAC $54_1$.

If a type (10) loading operation is initiated, the affinity control $46_1$ logically provides a reset signal that resets the count field of a matching RPID. If a matching RPID is not found, a miss signal is sent from the PAC $54_1$ to the affinity control $46_1$ via bus $76_1$. In the event of a miss, the PAC $54_1$ also sends via bus $76_1$ the logical address of the RPID with the lowest count field value to the affinity control $46_1$. The affinity control $46_1$ subsequently writes the eight bit PID that missed into the cache line in the PAC $54_1$ that corresponds to the logical address sent with the miss signal, sets the valid bit of that line, and resets the count field of that line to zero. Alternatively, another embodiment provides that upon such a miss, the PAC $54_1$ sends the logical address of the first cache line that has a its valid/invalid bit marked as invalid as the replacement criterion.

Referring back to FIG. 2 in operation, the processor $P_1$ writes instructions and data to CRG0 to perform one of the four operations in Table 1. When the current operation is completed, the affinity control $46_1$ sends a control signal to the processor $P_1$ to indicate that the affinity scheduling operation is completed and the processor may continue program execution. After this complete signal is sent, MUX $58_1$ switches a ten bit output from cache status RAM $42_1$ onto the input of the PAC $54_1$ via bus $74_1$. If the result of an access is a cache miss, as detected by monitoring the match/miss control line in bus $48_1$, the ten bit output of the cache status RAM $42_1$ is tested by the affinity control $46_1$ via bus $82_1$. If the valid/invalid bit is asserted and the kernel/user bit is reset, a lookup is performed in the PAC $54_1$. If a matching RPID entry is found in the PAC $54_1$, the associated count is decremented by the affinity control $46_1$, since a cache line belonging to that process is being replaced in the cache memory store $C_1$. This operation takes place while the cache controller $30_1$ is requesting and obtaining the system interconnect 12 to perform a cache line fill from common memory 16 (shown in FIG. 1).

Next, the MUX $58_1$ switches the eight bit PID from the PID register $60_1$ to the input of the PAC $54_1$ via buses $62_1$ and $74_1$. At the same time, affinity control $46_1$ controls bus driver $66_1$ to transmit the kernel/user bit and the eight bit PID from PID register $60_1$ to the input/output port of the cache status RAM $42_1$ via buses $62_1$ and $68_1$. While a cache line is being accessed from common memory, a lookup is performed in the PAC $54_1$, except if the kernel/user bit is reset since no kernel RPIDs are stored into the PAC $54_1$. As the cache line is stored in the cache memory store $32_1$, the kernel/user bit and the eight bit current PID is written from the PID register $60_1$ to the cache status RAM $42_1$ and the valid/invalid bit is set. If the current PID from the PID register $60_1$ has a kernel/user bit that is reset to logic zero, the matching entry in the PAC $54_1$ will have its count field incremented since the associated user process now has an additional line in the cache memory store $32_1$ and/or the on-chip cache of the processor $P_1$ (not shown).

In addition to cache actions caused by processor $P_1$, the affinity control $46_1$ also monitors the control bus $48_1$ to determine if an invalidating snoop cycle initiated by another processor of the computer system 10 (shown in FIG. 1) is affecting the local cache $32_1$. If a snoop cycle that invalidates at least one cache line of cache memory store $32_1$ is detected by the affinity control $46_1$, the eight bit PID of the invalidated cache line will be entered into the PID register $60_1$ and this eight bit PID is transmitted to the PAC $54_1$ test for an RPID match. If a match occurs, the count field in the cache line of the matching RPID is decremented. Thus, the affinity scheduling system $40_1$ remains coherent when another processor in the system 10 writes to or reads with intent to write to, i.e. read for ownership, an address contained in a line stored in a local cache of the processor $P_1$.

In this manner, each affinity scheduling system maintains a count of the total number of cache lines associated with up to eight of the most recently executed user processes that are presently in its respective cache memory store of its respective processor. If a process is suspended, for example for system I/0 or time slice expiration, the local processor will re-enter the kernel of the operating system and will set the kernel/user bit associated with the PID of that process. Further, the processor should write a toggle operation (00) shown in Table 1 to its control register CRG0 of its affinity control $46_1$. The kernel/user bit being set will indicate to the affinity scheduling system $40_1$ that this process is not ready to run and it will not be contained in the PAC $54_1$ as one of the eight most recently run programs. Thus, the PAC $54_1$ only contains RPIDs of ready to run, high affinity processes. This provides the best criterion for affinity scheduling.

Figure 6:
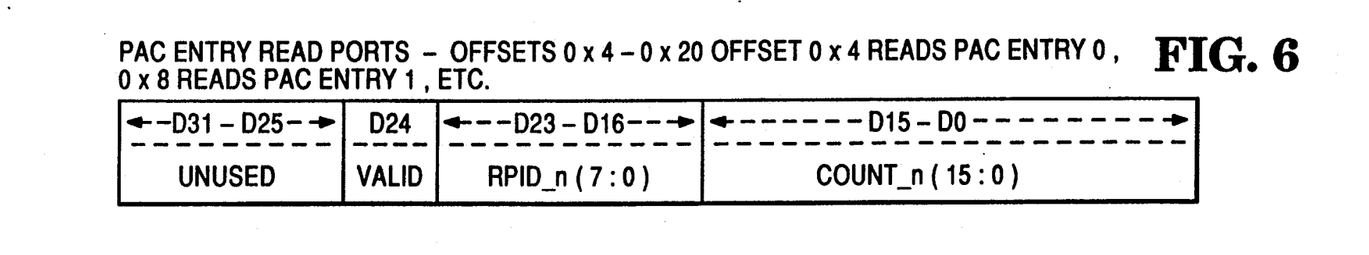
FIG. 6 is a block diagram of a process affinity cache read input register according to the invention.
Figure 9:
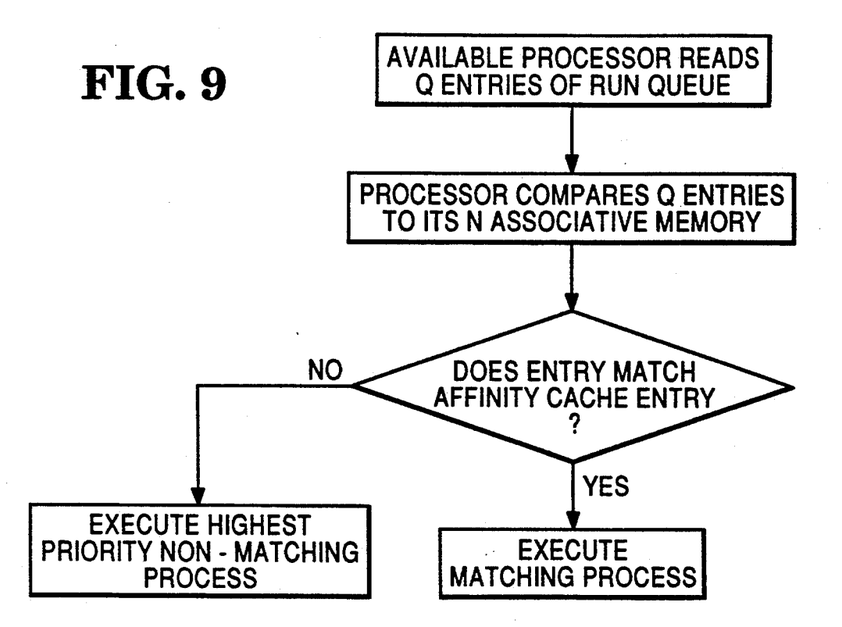
FIG. 9 is a flow diagram showing one method of operating an affinity scheduling apparatus in accordance with the invention.
Figure 10:
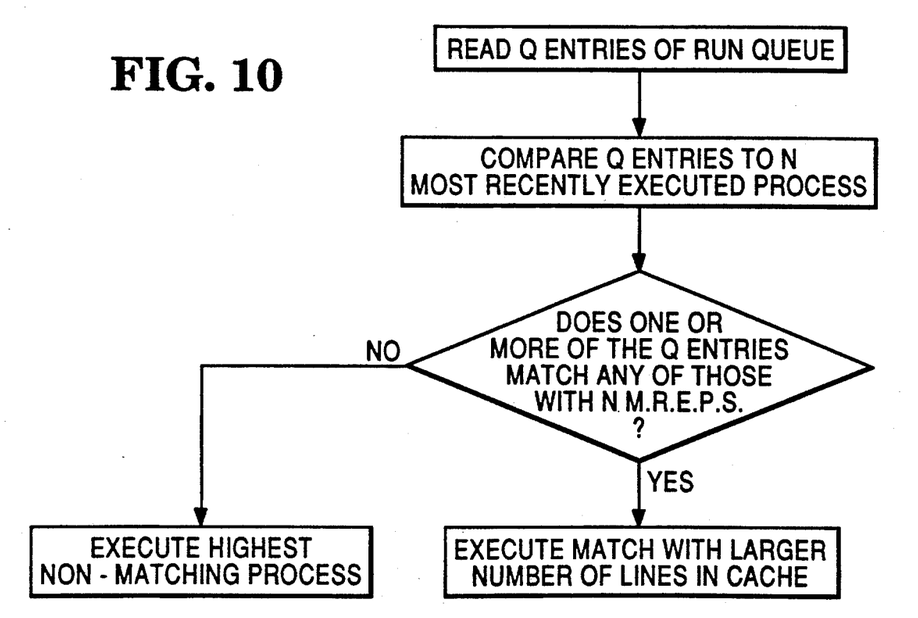
FIG. 10 is a flow diagram showing another method of operating an affinity scheduling apparatus in accordance with the invention.

As a processor $P_1$-$P_P$ becomes available for a next process, it can read the up to eight entries in its PAC-1-PAC$_P$ by reading 32 bit words from an output port of the PAC. The data format of the 32 bit word is shown in FIG. 6. After reading the eight line entries in its respective PAC, the available processor has data that describe the eight processes that have the greatest affinity for the processor. If one or more of these eight processes are in the run queue as ready-to-run, the processor can schedule the process that occupies the greatest number of lines in its respective cache memory system $C_1$-$C_P$. Since this process on the run queue must be executed sooner or later, it will be executed more efficiently by the processor that has to load fewest lines into its cache in order to run it. Methods for selecting ready-to-run user processes from the system run queue according to the affinity of the process for the available processor are shown in FIGS. 9 and 10.

Figure 7:
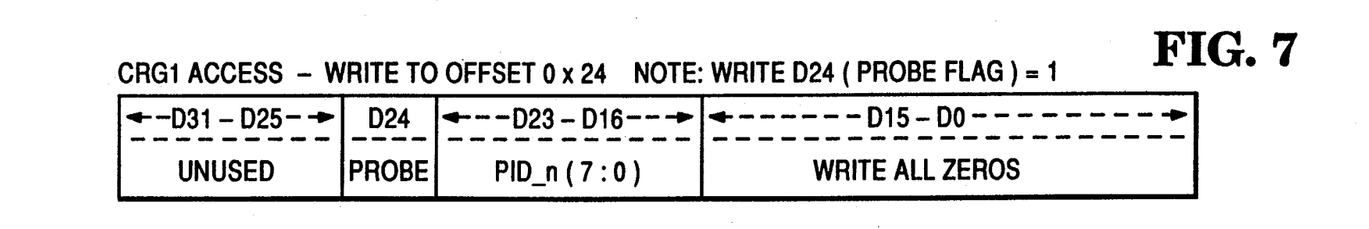
FIG. 7 is a block diagram of a control register one according to the invention.
Figure 8:
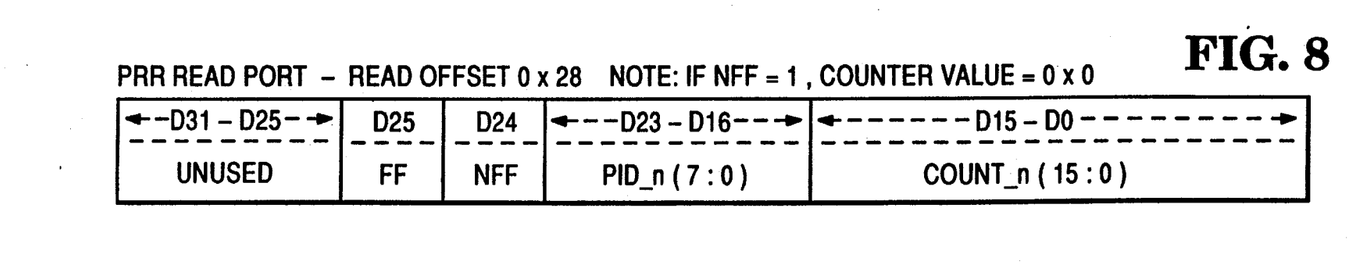
FIG. 8 is a block diagram of a result register according to the invention.

Referring now to FIGS. 7 and 8, an alternate process for affinity scheduling is to include a probe capability within the affinity scheduling system $40_1$. Such a process uses a second control register CRG1 that has a data format as shown in FIG. 7 and a result register having a data format as shown in FIG. 8. The process provides that a PID is extracted from a ready-to-run process identification number of a process in the run queue. This is accomplished by writing an eight bit probe PID into CRG1. This write triggers the affinity control $46_1$ to compare the probe PID to the RPID entries in the PAC $54_1$. If no matching entry is found, the result register is loaded with the probe PID, a count field of all zeroes, and a not found flag is asserted. If a matching RPID entry is found, the result register is loaded with the probe PID, the count field associated with the matching RPID entry, and a found flag is asserted. The processor can read the result register and then run the found process.

Thus, it will now be understood that there has been disclosed a new and novel cache affinity scheduling apparatus. While the invention has been particularly illustrated and described with reference to preferred embodiments thereof, it will be understood by those skilled in the art that various change in form, details, and applications may be made therein. For example longer PID numbers to make a greater number of them available. Also, the process affinity cache could be expanded beyond eight entries to encompass more of the most recently executed processes. It is accordingly intended that the appended claims shall cover all such changes in form, details and applications which do not depart from the true spirit and scope of the invention.

What is claimed is:

1. An apparatus for use with a computer system having a plurality of processors each having a local external cache memory, comprising:

an affinity cache means for storing in a plurality of cache data lines identification codes that identify the most recently executed user processes;

each of said cache data lines containing data which indicates the number of data lines occupied in the local external cache by a respective user process; and means for comparing an identification code of a ready-to-run process listed in a run queue of the computer system to each of said identification codes in said affinity cache means to determine if a user process has an affinity for an available processor.

2. An apparatus for use with a computer system having a plurality of processors each having a local external cache memory, comprising:

an affinity cache means for storing in a plurality of cache data lines identification codes that identify the most recently executed user processes;

each of said cache data lines containing data which indicates the number of data lines occupied in the local external cache by a respective user process;

means for comparing an identification code of a ready-to-run process listed in a run queue of the computer system to each of said identification codes in said affinity cache means to determine if a user process has an affinity for an available processor; and means for associating and storing a respective kernel-/user bit with each of the plurality of identification codes in said affinity cache means.

3. An apparatus for use with a computer system according to claim 2, wherein said affinity cache means is a fully associative cache memory.

4. An apparatus for use with a computer system according to claim 2, further comprising means for storing a respective valid/invalid bit that is associated with each of the plurality of identification codes in said affinity cache means.

5. An apparatus for use with a computer system having a plurality of processors each having a local external cache memory, comprising:

an affinity cache means for storing identification codes of a plurality of most recently executed user processes in a plurality of cache data lines thereof;

each of said cache data lines of said affinity cache means having a counter value stored therein of a number of data lines of a user process that corresponds to a number of cache data lines that the user process occupies in the local external cache;

means for comparing an identification code of a ready-to-run process listed in a run queue of the computer system to each of said identification codes in said affinity cache means and providing an indicator signal if said identification codes match; and means for associating and storing a respective kernel-/user bit with each of the plurality of identification codes in said affinity cache means.

6. An apparatus for use with a computer system according to claim 5, wherein said affinity cache means is a fully associative cache memory.

7. An apparatus for use with a computer system according to claim 5, further comprising means for storing a respective valid/invalid bit that is associated with each of the plurality of identification codes in said affinity cache means.

* * * * *